(12) United States Patent
Chen (10) Patent No.: US 7,817,333 B2
(45) Date of Patent: Oct. 19, 2010

(54) MODULATOR WITH IMPROVED SENSITIVITY AND LIFE TIME

(75) Inventor: Xianhai Chen, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 926 days.

(21) Appl. No.: 11/671,954

(22) Filed: Feb. 6, 2007

(65) Prior Publication Data

US 2008/0186563 A1 Aug. 7, 2008

(51) Int. Cl.
G02F 1/01 (2006.01)
G02F 1/1334 (2006.01)
G02F 1/135 (2006.01)
C09K 19/04 (2006.01)
C09K 19/38 (2006.01)
C09K 19/54 (2006.01)

(52) U.S. Cl. .................. 359/321; 428/1.1; 428/1.5; 349/30; 349/86; 252/299.01; 252/299.5

(58) Field of Classification Search ............... 428/1.1, 428/1.5; 349/86, 199, 30; 359/321; 324/770; 252/299.01, 299.5
See application file for complete search history.

(56) References Cited

U.S. PATENT DOCUMENTS

| 4,101,207 A | 7/1978 | Taylor |
| 4,950,052 A | 8/1990 | Fergason et al. |
| 4,992,201 A | 2/1991 | Pearlman |
| 5,270,843 A | 12/1993 | Wang |
| 5,285,299 A | 2/1994 | Drzaic et al. |
| 5,368,770 A | 11/1994 | Saupe et al. |
| 5,410,424 A | 4/1995 | Konuma et al. |
| 5,427,713 A | 6/1995 | Wartenberg et al. |
| 5,906,770 A | 5/1999 | Amundson |
| 5,951,912 A | 9/1999 | Mercer |

(Continued)

FOREIGN PATENT DOCUMENTS

WO WO 2005/101113 A2 10/2005

OTHER PUBLICATIONS

Schulte et al., "Fluorinated Polymer Dispersed Liquid Crystals: Electro-Optical and Morphological Properties," Dept of Materials Science and Engineering, Univ of Cincinnati (2) SAJC p. 522-3.

(Continued)

Primary Examiner—Shean C Wu
(74) Attorney, Agent, or Firm—Townsend and Townsend and Crew LLP (57) ABSTRACT

An electro-optic modulator assembly includes a sensor layer made from an electro-optic modulator material that comprises liquid crystal droplets encapsulated within a polymer matrix. The sensor layer material comprises an interfacial agent, for example a defoaming agent, in an amount sufficient to lower an intrinsic operating voltage at which the sensor layer transmits light. The defoaming agent can comprise from about 1 to about 10 percent by weight of the electro-optic modulator material, and the defoaming agent may comprise a reactive component to react with the polymer matrix, for example at least one of a siloxane with a reactive end group, a reactive fluorinated polymer or a non-ionic block copolymer to react with the polymer matrix. The assembly can also include a hard coating layer to protect the sensor layer.

7 Claims, 6 Drawing Sheets

U.S. PATENT DOCUMENTS

| | | | |
|---|---|---|---|
| 5,976,405 A | 11/1999 | Clikeman et al. | |
| 6,036,882 A | 3/2000 | Chung | |
| 6,108,062 A | 8/2000 | Takeuchi et al. | |
| 6,146,792 A | 11/2000 | Blanchet-Fincher et al. | |
| 6,151,153 A | 11/2000 | Bryan | |
| 6,211,991 B1 | 4/2001 | Bryan | |
| 6,270,691 B2 | 8/2001 | Park et al. | |
| 6,306,469 B1 | 10/2001 | Serbutoviez et al. | |
| 6,407,797 B1 | 6/2002 | Biradar et al. | |
| 6,866,887 B1 | 3/2005 | Chen et al. | |
| 7,099,067 B2 | 8/2006 | Chen | |
| 2005/0077005 A1 | 4/2005 | Chen et al. | |
| 2005/0270481 A1 | 12/2005 | Blum et al. | |

OTHER PUBLICATIONS

Wu, et al., "Novel Fast-Switching Polymer-Dispersed Liquid-Crystal Light Shutter and Display," SID 92 Digest p. 583-6.
International Search Report and Written Opinion of PCT Application No. PCT/US08/52417, dated Jul. 9, 2008, 13 pages total.

MODULATOR WITH IMPROVED SENSITIVITY AND LIFE TIME

BACKGROUND OF THE INVENTION

The present invention relates to liquid crystal materials for use in electro-optic applications. More particularly, the present invention relates to liquid crystal/polymer composite materials, and methods and apparatus for the manufacture and application of such composite materials. Merely by way of example, the materials, methods and apparatus of the present invention are described with reference to a voltage imaging system. The materials, methods and apparatus of the present invention can be used with other electro-optic applications, for example liquid crystal composite materials used in flat panel displays.

Voltage imaging technology may be employed to detect and measure for defects in flat panel thin film transistor (TFT) arrays. According to this measurement technique, the performance of a TFT array is simulated as if it were assembled into a TFT cell and then the characteristics of the TFT array are measured by indirectly measuring actual voltage distribution on the panel, or so-called voltage imaging, using an electro-optic (EO) light modulator-based detector.

A voltage imaging system in its most basic form includes an electro-optic (EO) modulator, an imaging objective lens, a charge coupled device (CCD) camera or other appropriate or similar sensor, and an image processor. The electro-optic sensor of the EO modulator is based on the light scattering characteristics of liquid crystal (herein after "LC") droplets in a polymer matrix, for example nematic liquid crystal droplets in a polymer matrix (liquid crystal/polymer composite, or LC/polymer) film. In operation, the EO modulator is placed approximately 5-35 microns above the surface of a thin film transistor (TFT) array, and a voltage bias is applied across a transparent electrode of a layer of indium tin oxide (ITO) on a surface of the EO modulator. Thereupon, the EO modulator capacitively couples to the TFT array so that an electric field associated with the TFT array is sensed by the liquid crystal/polymer composite layer. Intensity of incident light transmitted through the LC/polymer layer is varied, i.e., is modulated, by any variations in the electric field strength across the liquid crystal (LC) material in the liquid crystal/polymer composite material. This light is then reflected off a dielectric mirror and collected by the CCD camera or like sensor. A source of incident radiation, which may be for example infrared or visible light, is provided to illuminate the sandwich of TFT array, LC/polymer film and dielectric mirror.

Due to the close proximity of components relative to panels under test (PUT), LC/polymer modulator structures can be subject to damage in normal use by unwanted particles, which severely curtails useful life. Thus, modulator lifetime improvement can be one of the major objectives in LC/polymer modulator research and development.

Modulator sensitivity can be another important characteristic of an LC modulator device. Improved modulator sensitivity can lead to improved detection capability, and as such can be an important aspect of LC modulator development, in particular LC/polymer matrix research and development. In addition, some applications such as LC computer displays for notebooks can be sensitive to power consumption, such that improved sensitivity with lower voltages can lead to decreased power consumption and increased battery lifetime. Sensitivity for defect detection can be defined as the ratio of the change in transmitted light to the difference in voltage between a defective pixel and a good pixel on the TFT array.

Work in relation with the present invention suggests that current LC materials and the current manufacturing testing methods associated therewith, may be less than ideal. For example, particulate contamination can damage test apparatus, for example a voltage imaging system and/or the panel under test. Also, test apparatus sensitivity may be less than ideal.

While the above materials, apparatus and methods may be suitable for certain applications, there is a need in the art for improved electro-optic LC materials, more specifically improved-sensitivity and life-time performance of electro-optic LC materials and test apparatus.

BRIEF SUMMARY OF THE INVENTION

The present invention relates to liquid crystal materials for use in electro-optic applications. More particularly, the present invention relates to liquid crystal/polymer composite materials, and methods and apparatus for the manufacture and application of such composite materials. Merely by way of example, the materials, methods and apparatus of the present invention are described with reference to a voltage imaging system. The materials, methods and apparatus of the present invention can be used with other electro-optic applications, for example liquid crystal composite materials used in flat panel displays.

In many embodiments, the present invention provides an electro-optic modulator assembly. The assembly includes a sensor layer that comprises liquid crystal droplets encapsulated within a polymer matrix. The sensor layer comprises an interfacial agent in an amount sufficient to lower an intrinsic operating voltage at which the sensor layer transmits light. The assembly also includes a hard coating layer to protect the sensor layer.

In some embodiments, the present invention provides a method for fabricating a latex-based NCAP modulator. An NCAP latex based material that comprises an interfacial agent is coated on a plastic substrate with a transparent electrode. The coated substrate is covered with a plastic cover to sandwich the NCAP material between the plastic substrate and the plastic cover. The sandwiched NCAP material is laminated on an optical block substrate. The plastic cover is removed. A dielectric mirror pellicle is laminated over the NCAP latex based material. The dielectric mirror pellicle is coated with a UV curable organic coating. The UV curable organic coating is UV cured to an organic hard coat.

In some embodiments, the present invention comprises an NCAP latex-based modulator with a protective coating. The modulator comprises an NCAP latex based material comprising an interfacial agent. A dielectric mirror pellicle is laminated on top of the NCAP material. A cured UV curable organic hard coating is on the mirror pellicle.

In many embodiments, the present invention provides an electro-optic modulator material. The material comprises droplets that include liquid crystal molecules. A polymer matrix encapsulates and supports the droplets. A defoaming agent is present in an amount sufficient to decrease an operating voltage at which an orientation of the liquid crystal molecules changes to transmit light through the material.

In specific embodiments, the defoaming agent can comprise from about 1 to about 10 percent by weight of the electro-optic modulator material. The defoaming agent can comprise a reactive component to react with the polymer matrix, for example at least one of a siloxane with a reactive end group, a reactive fluorinated polymer or a non-ionic block copolymer to react with the polymer matrix.

In many embodiments, the present invention provides an NCAP electro-optic modulator material. The material comprises droplets that include liquid crystal molecules, and a latex based polymer matrix encapsulates and supports the droplets. An interfacial agent is present in an amount sufficient to decrease an operating voltage at which an orientation of the liquid crystal molecules changes to transmit light through the material.

In many embodiments, the present invention provides an NCAP electro-optic modulator material. The material comprises droplets that include liquid crystal molecules, and a water-soluble polymer-based polymer matrix that encapsulates and supports the droplets. A defoaming agent is present in an amount sufficient to decrease an operating voltage at which an orientation of the liquid crystal molecules changes to transmit light through the material. In specific embodiments, the defoaming agent comprises a reactive defoaming agent to react with the water-soluble polymer and decrease the operating voltage of the material.

In some embodiments, the present invention provides a method of making an NCAP electro-optic material. The method comprises combining a liquid crystal material with a latex emulsion. The liquid crystal material is emulsified in the presence of at least one interfacial agent to form an emulsion comprising droplets of the liquid crystal material. The emulsion is applied to a substrate and dried to encapsulate the droplets with a latex based matrix. An amount of the interfacial agent is sufficient to decrease an operating voltage at which a molecular orientation of the liquid crystal material changes to transmit light through the material.

In some embodiments, the present invention provides a PDLC electro-optic modulator material. The material comprises droplets that include liquid crystal molecules, and a solvent-induced phase separation PDLC formulation encapsulates and supports the droplets. A defoaming agent is present in an amount sufficient to decrease an operating voltage at which an orientation of the liquid crystal molecules changes to transmit light through the material.

DETAILED DESCRIPTION OF THE INVENTION

The present invention relates to liquid crystal materials for use in electro-optic applications. More particularly, the present invention relates to liquid crystal/polymer composite materials, and methods and apparatus for the manufacture and application of such composite materials. Merely by way of example, the materials, methods and apparatus of the present invention are described with reference to a voltage imaging system. The materials, methods and apparatus of the present invention can be used with other electro-optic applications, for example liquid crystal composite materials used in flat panel displays.

Four patents, assigned to Photon Dynamics Inc., describe the modulator assembly and LC material coating processes using such materials: "Modulator Transfer Process and Assembly", Michael A. Bryan, U.S. Pat. No. 6,151,153 (2000); "Modulator Manufacturing Process and Device", Michael A. Bryan, U.S. Pat. No. 6,211,991 B1 (2001); "Method for Manufacturing PDLC-Based Electro-Optic Modulator Using Spin Coating, Xianhai Chen, U.S. Pat. No. 6,866,887 B1 (2005); and "Scratch and Mar Resistant PDLC Modulator", Xianhai Chen, U.S. Pat. No. 7,099,067 B2 (2006); the entirety of each of the above referenced patents is hereby incorporated herein by reference for all purposes.

Figure 1:
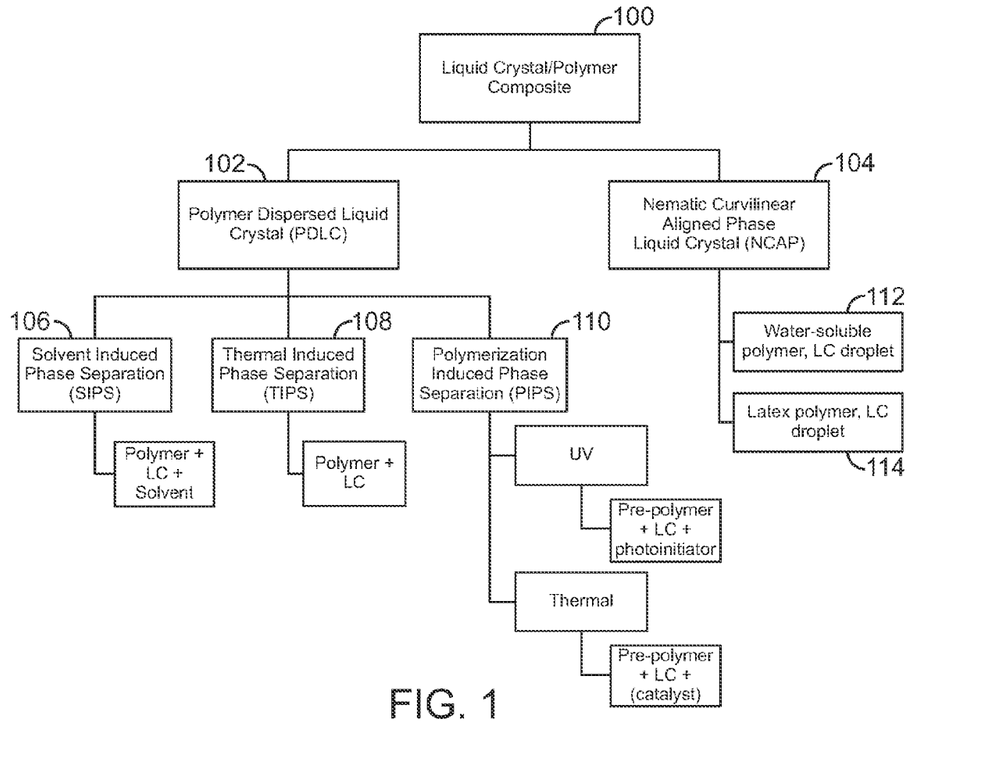
FIG. 1 shows classes of liquid crystal/polymer composite materials suitable for incorporation of an interfacial agent according to embodiments of the present invention.

FIG. 1 shows the classes of liquid crystal/polymer composite materials suitable for incorporation of an interfacial agent that can be used with EO modulators and methods of fabrication, according to embodiments of the present invention. As shown in FIG. 1, there are two main classes of liquid crystal/polymer composite materials: polymer dispersed liquid crystal, PDLC 102, and nematic curvilinear aligned phase liquid crystal, NCAP 104. The first main class of materials, PDLC 102, may comprise films fabricated in any of several ways as shown by example in FIG. 1. Solvent induced phase separation, SIPS 106, can be used to make PDLC 102 and has been described in prior patents. In SIPS 106, the liquid crystal (LC) and polymer are dissolved in a common solvent at step 106A, and the solvent is evaporated allowing LC droplets to form. To further improve mechanical properties (such as toughness) of the final PDLC film, polymers that can be cross-linked are often used. Another method of PDLC 102 synthesis uses polymerization induced phase separation, PIPS 110. PIPS process can begin with a mixture of LC and pre-polymers (and/or monomers) at step 110A, and then apply radiation such as ultraviolet light at step 110B. PIPS 110 process can also include a mixture of catalyst, LC and pre-polymer at step 110C followed by heat at step 110D to form the final PDLC film. PIPS 110 process methods are described by prior patents. A third method of PDLC 102 film synthesis is thermal induced phase separation, TIPS 108. In this case, a polymer and LC are heated at step 108A until the mixture becomes homogenous. The LC is then phase separated from the polymer during the cooling process.

The second main class of materials, NCAP 104, can be suitable for making very large area light valves and displays, and has been described in prior patents. NCAP materials are generally water-based, and can be further divided into two subclasses as shown in FIG. 1. One subclass comprises a water-soluble polymer 112, such as polyvinyl alcohol (PVA). This particular subclass of materials can be moisture sensitive because of the hydrophilic property of the water-soluble polymer, and this subclass has been described in prior patents. In some instances, this moisture sensitive property can contribute to degradation of electro-optical performance over time. Therefore water-soluble polymer-based NCAP may have limited lifetime and limited commercial value.

The second subclass of NCAP materials is latex-based 114. Latex comprises a water-insoluble polymer. Such NCAP materials can be comprised of small latex particles dispersed in water with the liquid crystal. These small latex particles can "fuse" into continuous polymer phase that is irreversible once the water is removed. Some applications using this latex-based NCAP have long-term electro-optical stability, and hence may have high commercial value.

Figure 2:
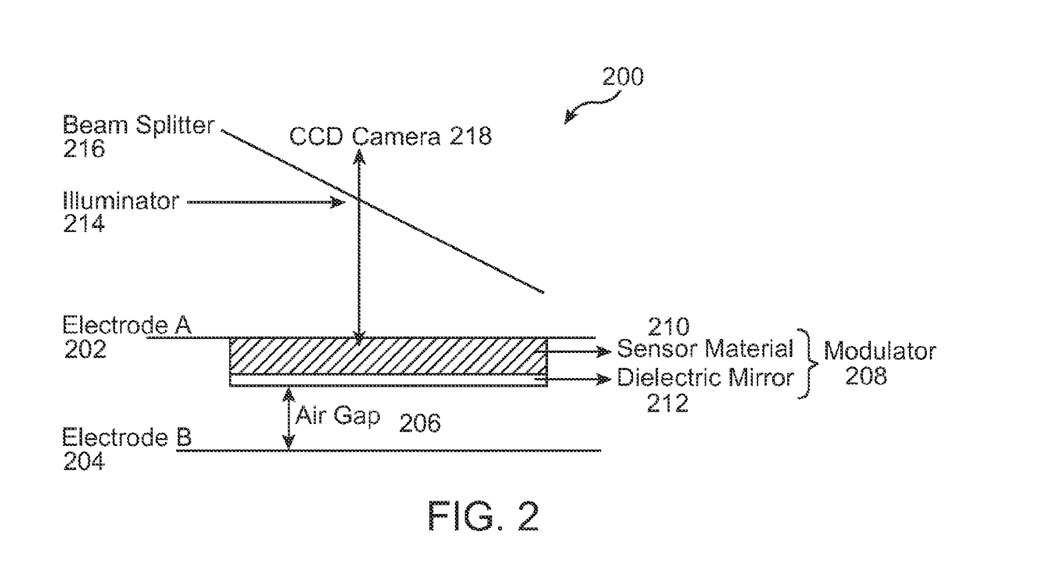
FIG. 2 is a schematic illustration of a voltage imaging system including an electro-optical modulator comprised of LC/polymer sensor material, according to embodiments of the present invention.

FIG. 2 shows the major components of a voltage imaging system 200, according to embodiments of the present invention. Voltage imaging system 200 comprises an electro-optic modulator 208, an illuminator 214, a beam splitter 216 and a CCD camera 218. Electro-optic modulator 208 can include of a transparent Electrode A 202 supported on a transparent substrate, a sensor material 210, and a dielectric mirror 212 supported by a thin plastic film, for example a pellicle. Electrode A 202 may be a film made of indium tin oxide (ITO) which is transparent to visible light. The liquid crystal sensor material 210 has electro-optical response under electric field, and the sensor material may be any of those described by FIG. 1. In many embodiments, a latex-based NCAP is used. An electrode B 204 can comprise the panel under test (PUT), for example a TFT plate. By applying voltage to Electrode A and ground to the Electrode B, a transmission-voltage (T-V) curve can be obtained. For TFT testing, if a constant voltage near the middle of response curve is applied to the modulator, the voltage applied on each pixel can be detected in terms of light intensity change from CCD camera 218. A defective pixel will give an abnormal response.

The voltage applied between Electrodes A and B can be expressed by the following equations:

$$V_{Bias} = V_{sensor} + V_{pellicle} + V_{air} \quad [\text{Eq. 1}]$$
$$= V_{sensor}[1 + (\varepsilon_{sensor} * d_{pellicle})/(\varepsilon_{pellicle} * d_{sensor}) + (\varepsilon_{sensor} * d_{air})/d_{sensor}]$$

$V_{Bias}$ is the voltage applied between Electrode A and Electrode B;
$V_{sensor}$ is the required voltage for sensor material;
$V_{pellicle}$ and $V_{air}$ are the voltages across pellicle and air gap;
$\varepsilon$ is the dielectric constants of the respective material, and
d is the thickness of the respective material.

With a fixed $V_{Bias}$, the air gap between the electrodes, $d_{air}$, is a function of the intrinsic operating voltage ($V_{sensor}$) of the liquid crystal sensor material. In many embodiments, the intrinsic switching voltage of the liquid crystal sensor material corresponds to the voltage across the sensor material at which light transmission through the sensor material has a maximum sensitivity to a change in voltage across the sensor material, as explained more fully below with reference to FIGS. 3A and 3B. In specific embodiments, the operating voltage across the electrodes is related to the intrinsic switching voltage of the LCD material by use of the above equations. In many embodiments, switching speed can be decreased by providing a material with a decreased intrinsic switching voltage.

Figure 3A:
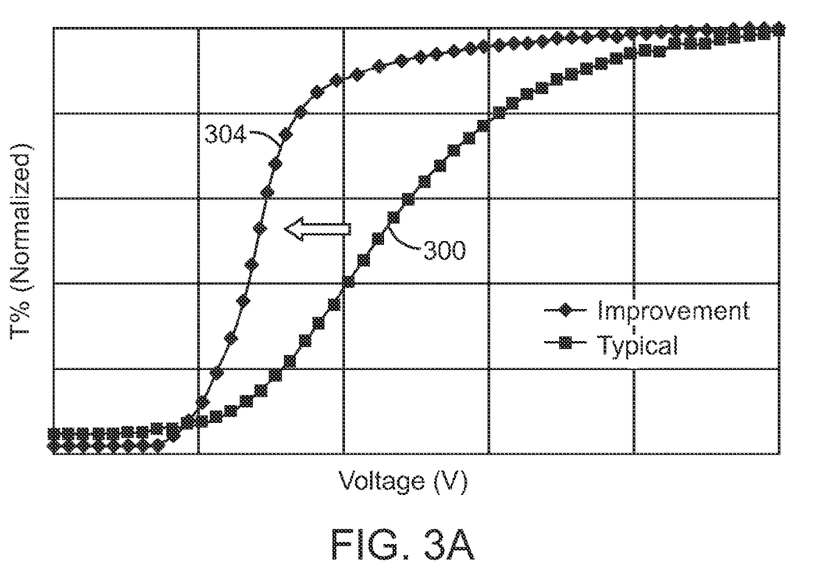
FIG. 3A is an example of transmission-bias voltage curves for LC/polymer composite modulators; according to embodiments of the present invention.

FIG. 3A is an example of transmission-bias voltage curves for LC/polymer composite modulators, according to embodiments of the present invention. A curve 302 illustrates voltage response characteristics of LC/polymer composition materials without an interfacial agent, as described herein. For optimized electro-optical modulator performance, the goal is to shift the voltage response curve to a curve 304 that is steeper and shifted to a lower voltage. In many embodiments, this voltage response characteristic can allow higher sensitivity at lower operating voltage, and can also allow a larger air gap at the same operating voltage. In some embodiments, this voltage response characteristic allows a higher sensitivity with a lower operating voltage and a larger air gap. The higher sensitivity can lead to improved defect detection. The increased air gap can provide longer modulator life.

Figure 3B:
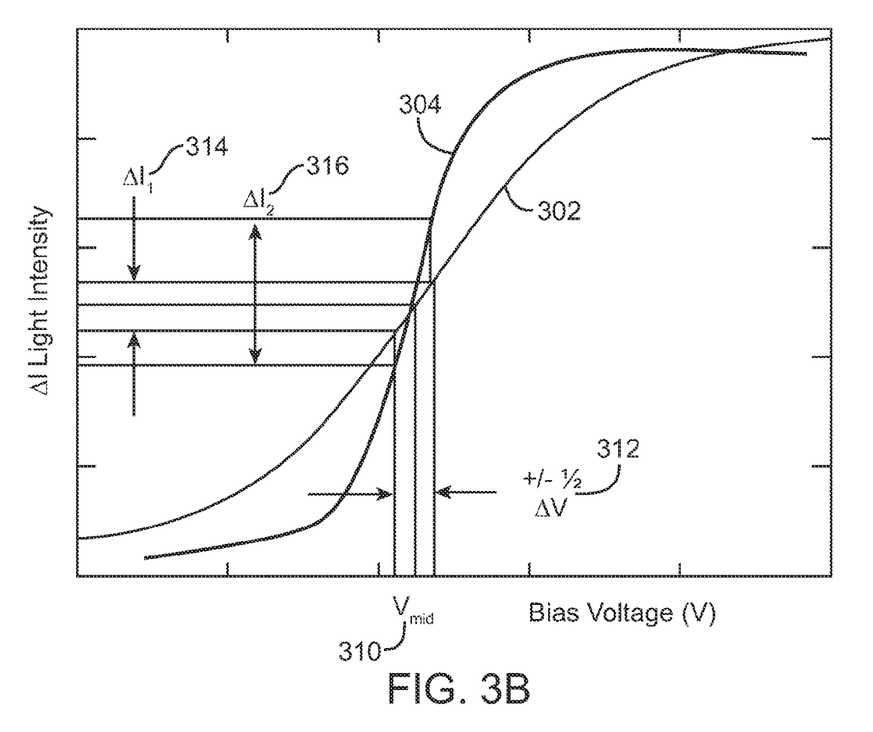
FIG. 3B is an example of transmission-bias voltage curve for LC/polymer composite modulators, with operating point, according to embodiments of the present invention.

The slope of the transmission curve reflects the sensitivity of the LC device. The sensitivity of the LC imaging device, expressed as the slope of the transmission curve, generally corresponds to the change in transmission in percent (%) per change in voltage applied across Electrode A and Electrode B, described above. As shown in FIG. 3B, the midpoint of the transmission curve is roughly determined for a voltage $V_{mid}$ 310 and with no voltage on the TFT plate, and at a fixed gap size between the plate and the LC device. Then, a small change in voltage $+/-\frac{1}{2}\Delta V$ 312 is applied to a pixel on the TFT plate, and the change in transmission is measured. For transmission curve 302 the change in transmission is $\Delta I_1$ 314 for the voltage $+/-\frac{1}{2}\Delta V$ applied to the pixel. For steeper transmission curve 304, the change in transmission is $\Delta I_2$ 316 for the same $+/-\frac{1}{2}\Delta V$ 312 applied to the pixel, and $\Delta I_2$ is greater than $\Delta I_1$. Thus, for the same change in voltage applied to a pixel, a greater signal ($\Delta I_2$) results if the transmission curve is steeper.

In TFT testing system, the signal captured by the CCD (218 in FIG. 2) is proportional to the slope of the modulator transmission curve. According to Equation 1, the transmission curve gets flatter (slope reduced) if the air gap ($d_{air}$) is increased to avoid modulator damage and/or improve the life time. The voltage distributed on the modulator will decrease with larger air gap. The sensitivity can be improved by reducing the intrinsic switching voltage of the LC material in the modulator, such that the voltage imaging system device will have a reduced intrinsic operating voltage.

In many embodiments, the reduced intrinsic switching voltage of the electro-optic LC materials described herein, can be used to provide an increased air gap without substantially compromising the sensitivity of the voltage imaging system. The air gap can be at least about 15 micrometers, for example in a range from about 30 to 70 micrometers.

The operating voltage and sensitivity of liquid crystal sensing materials such as NCAP or PDLC are related to:
1. Properties of liquid crystal and polymer matrix;
2. Liquid crystal droplet size distribution in sensor material;
3. Interface properties between polymer matrix and liquid crystal.

More specifically, the slope of the curves in FIGS. 3A and 3B is affected by the droplet size distribution and the interface properties between the polymer matrix and liquid crystal. A steeper slope can result if droplets are of uniform size and if the crystals within the LC droplet can move and/or switch easily relative to the polymer matrix. The voltage shift of the curve shown in FIGS. 3A and 3B can be affected by the interface properties between the polymer matrix and liquid crystal. The curve may shift to lower voltage if the LC can move and/or switch easily relative to the polymer matrix. Embodiments of the present invention reduce the interface anchoring and/or friction between the polymer matrix and liquid crystal in order to make the T-V curve slope steeper and also to shift the operating voltage of LC material and the voltage imaging system to a lower range. Anchoring of the LC molecules to the polymer matrix can increase the intrinsic operating voltage of the LC material. Frictional forces can comprise anchoring forces that may be associated with static friction of the LC molecules to the polymer matrix and may also comprise dynamic friction associated with relative motion between the LC molecules and the polymer matrix. As friction may affect the speed at which molecules move in relation to the surrounding polymer matrix, decreased friction may increase the switching speed of the LC molecules. As an increase in voltage may be required to overcome anchoring of the LC molecules to the polymer matrix, increased anchoring may be related to an increased intrinsic operating voltage of the LC composite material.

Overview of NCAP Formulation Process

Figures 10A, 10B:
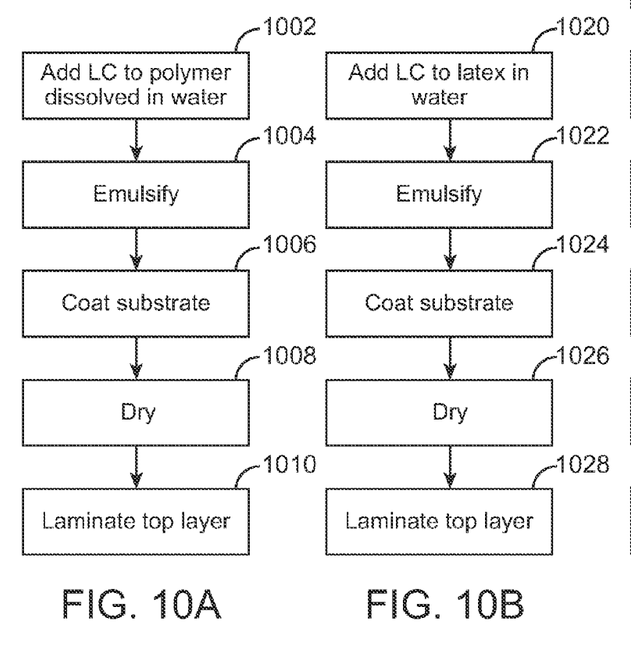
FIG. 10A shows process flow for preparation of water-soluble polymer-based NCAP, according to embodiments of the present invention.
FIG. 10B shows one process flow for preparation of latex-based NCAP, according to embodiments of the present invention.
Figure 10C:
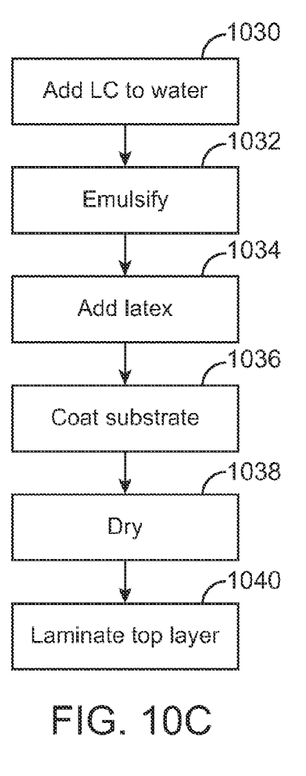
FIG. 10C shows an alternative process flow for preparation of latex-based NCAP, according to embodiments of the present invention.

The processes of making a water-soluble polymer NCAP liquid crystal formulation and a latex-based NCAP liquid crystal formulation are shown in FIGS. 10A-10C, according to embodiments of the present invention. As shown in FIG. 10A, a process 1000 to make a water-soluble polymer NCAP formulation process at a step 1002 of adding liquid crystal to the homogenous solution of polymer already dissolved in water, for example polyvinyl alcohol (PVA) dissolved in water. This combination comprises a two phase system, much like an oil and water combination. To improve electrical performance, the LC material can be broken down into smaller droplets (on the order of a few microns in size) that are evenly dispersed within the polymer material. A step 1004 of process 1000 then emulsifies the LC mixture, in many embodiments by using mechanical force such as a high speed blade. After emulsification, the mixture is applied to a substrate at a step 1006, in many embodiments as a thin coating (on the order of tens of microns thick). At a step 1008, the water within the coating mixture can be permitted to evaporate. A step 1010 sandwiches the dried NCAP between the first substrate and a second substrate that is laminated on top.

A process 1018 to formulate the latex-based NCAP is shown in FIG. 10B, according to embodiments of the present invention. A step 1020 adds LC to latex which is already mixed with water. A step 1022 emulsifies the LC, latex and water combination using a high speed blade. A step 1024 coats the mixture on a substrate. A step 1026 allows the mixture coated on the substrate to dry. A step 1028 then laminates a second substrate over the dried formulation to cover the NCAP formulation.

A process 1029 for making latex-based NCAP formulation is shown in FIG. 10C, according to embodiments of the present invention. A step 1030 adds the LC to water. A step 1032 emulsifies the LC and water combination. A step 1034 then adds latex and mixes the latex with the water and liquid crystal. A step 1036 coats a substrate with the latex, water and LC mixture. A step 1038 allows the formulation to dry. A step 1040 laminates a second substrate over the dried formulation to cover the completed NCAP formulation.

It should be appreciated that the specific steps illustrated in FIGS. 10A to 10C provide particular methods of making NCAP LC formulations according to embodiments of the present invention. Other sequences of steps may also be performed according to alternative embodiments. For example, alternative embodiments of the present invention may perform the steps outlined above in a different order. Moreover, the individual steps illustrated in FIGS. 10A to 10C may include multiple sub-steps that may be performed in various sequences as appropriate to the individual step. Furthermore, additional steps may be added or removed depending on the particular applications. One of ordinary skill in the art would recognize many variations, modifications, and alternatives.

In many embodiments, the formulation of NCAP LC mixtures, surfactants (surface active agents) may be added to improve the formulation/fabrication process and/or to improve the performance of the resulting NCAP material. Surfactants typically are-molecules chemically comprised of lyophilic (liquid-loving) and lyophobic (liquid-hating) groups. For aqueous solutions, these groups are more specifically called hydrophilic (water-loving) and hydrophobic (water-hating), respectively. In general, a surfactant molecule has both a hydrophilic group and a hydrophobic group located on the molecule so as to affect surface activity by reducing the surface energy of the liquid and/or solid. Further, surfactants may play roles as foaming agents, defoaming agents, dispersants (to increase the solubility of LC in the polymer medium, for example), surface adhesion agents, agents to ensure to stability of emulsion, agents to control particle size, and so forth.

In the embodiments illustrated in FIGS. 10A-C, one or more surfactants may be added at any of the steps that emulsify the LC, for example any of step 1004, step 1022 and/or step 1032. In many embodiments, undesirable foaming can occur during the emulsification step, and a defoaming (or anti-foaming) surfactant may be added. Droplet size can be controlled during emulsification by parameters such as mixing speed or mixing time. As noted above, the electrical performance of the NCAP can depend on the distribution and size of the LC particles suspended within the polymer medium, and the distribution and particle size can be controlled for optimal performance. For example, U.S. Pat. No. 4,992,201, incorporated herein by reference, describes the addition of a chosen surfactant to control and stabilize the LC particle size and size distribution. Embodiments of the present invention are not limited to the use of a single surfactant and a plurality and/or several surfactants can be used simultaneously in a LC composition prior to coating, and another and different surfactant may be added optionally before the any of the coating steps, for example step 1006, step 1024, or step 1036, to improve the wetting property of the NCAP to the substrate material. Embodiments of the present invention employ the addition of surfactants with specific characteristics to enhance performance of the NCAP material, for example surfactants with high viscosities that can be used as a defoamer during the emulsification process.

Sensitivity Improvements

The sensitivity of the liquid crystal material may be improved by several means. In many embodiments, careful selection is made of the liquid crystal material or polymer material itself. For example, some methods may seek to modify the polymer matrix. Another approach focuses on optimizing the liquid crystal size uniformity. Another approach focuses on modifying the crosslinking density or rate. Yet another approach focuses on reducing the friction or interface anchoring between the LC molecules and the polymer.

Techniques for reducing the interface anchoring include, for example:

1) Adding dopants or co-monomers into the polymer matrix. In this method, the added substances can be randomly distributed into the polymer matrix. Although this technique may change the bulk property of polymer matrix rather than polymer/LC interface, the use of interfacial agents as described herein can enhance formation of the additive near the LC/polymer interface so as to reduce changes to the bulk properties of the polymer matrix.

2) Creating a "force relaxation" layer made of uncured transparent material derived from decomposition of LC and also including orientation-imparting agents to align the LC. Although this material may dissolve into the LC phase, the use of interfacial agents with reactive components, for example defoaming agents with reactive components, can minimize dissolution into the LC phase.

3) Using reactive silanes. The alkoxysilyl groups in silane can polymerize in the presence of moisture (or water) in the emulsion. These may form a layer outside of the LC droplets in emulsion and thus may alter the interface property, providing reduced anchoring. Although this method may generate alcohol by-products and water can make the process hard to control, the use of interfacial agents with siloxanes with reactive end groups, for example polysiloxanes, can provide improved process control.

Figures 4A, 4B, 4C:
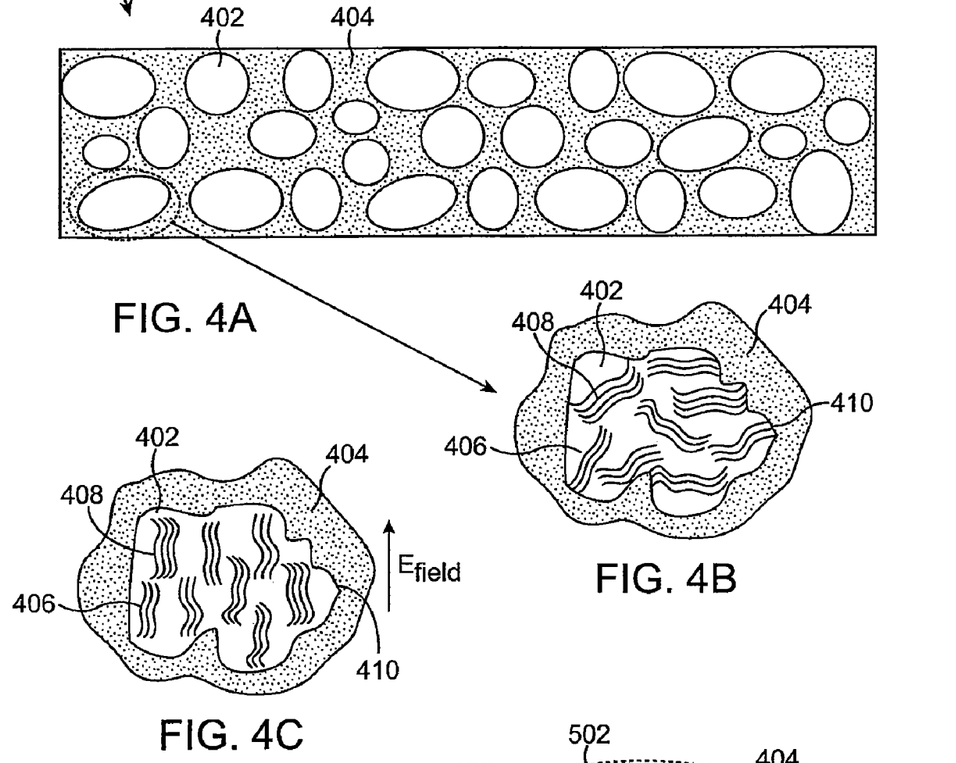
FIGS. 4A to 4C are schematic illustrations of LC/polymer composite material, with close-up of the LC-to-polymer boundary, according to embodiments of the present invention.

FIGS. 4A to 4C illustrate an LC material 400 comprising droplets, for example droplet 402, of liquid crystal suspended in a polymer matrix 404, according to embodiments of the present invention. In many embodiments, LC material 400 comprises an NCAP material, such as a water-soluble polymer-based NCAP material or a latex polymer-based NCAP. In some embodiments, material 400 can comprise a PDLC LC material. Each droplet can comprise several LC molecules 406 and is often from about one to five microns in size. Within each droplet, LC molecules 406 may coalesce to form small crystals 408, and these crystals may be randomly oriented within the droplet while no electric field is present. The LC molecules and/or crystals may anchor to the polymer matrix, as schematically shown at attachment locus 410 in FIG. 4B. In many embodiments, the degree of anchoring depends on the LC molecule and polymer chemistries. When an electric field is applied across the LC material 400, the LC molecules and/or crystals can at least partially align along the electric field direction as shown in FIG. 4C. For such alignment to occur, the LC molecules and/or crystals overcome the anchoring and/or friction with the polymer at attachment locus 410. As noted above, for best sensitivity, the goal is to invoke the largest change in transmission for the smallest voltage change possible. Thus, the lower the frictional force and/or anchoring, between the LC and the polymer, the lower the driving voltage required to switch the LC molecules and/or crystals from a substantially unaligned condition as in FIG. 4B to a condition substantially aligned with the electric field as in FIG. 4C. In many embodiments, the intrinsic switching voltage corresponds to the electric field strength at which about half of the LC molecules and/or LC crystals are substantially aligned with the electric field.

As noted above, there are two classes of NCAP. In many embodiments, the latex-based NCAP comprises a three-phase material, that includes water, liquid crystal, and latex. In many embodiments, the water-soluble polymer-based NCAP can comprise a two-phase material that includes liquid crystal and the water/polymer solution. The fabrication processes described generally by FIGS. 10A-10C and the discussions above show that the resulting NCAP is comprised of liquid crystal well distributed within a polymer, either latex or the residual polymer such as PVA after drying. To reduce the intrinsic operating voltage so as to improve, for example increase, switching speed of the resulting NCAP embodiments of the present invention include interfacial agent materials, for example surfactants, that after processing (emulsification, de-gas, coating, drying) provide reduced surface tension at the interface between the LC and polymer matrix. Because latex differs physically and chemically from water-soluble polymers (for example, polyvinyl alcohol), the physical and chemical interactions occurring during the fabrication process of a latex-based NCAP can differ from those occurring during fabrication of a water-soluble polymer-based NCAP. Therefore, the optimal interfacial agent materials identified for improved switching speed for latex-based NCAP may be different from the optimal interfacial agent materials identified for improving switching speed and/or reduced intrinsic switching voltage for water-soluble polymer-based NCAP. In latex-based NCAP embodiments, the interfacial agent material desired for improved switching speed and/or reduced intrinsic switching voltage may tie the LC to the latex, since water is a third-phase and is driven off during the drying process. In water-soluble polymer-based NCAP embodiments, the interfacial agent material desired for improved switching speed and/or reduced intrinsic switching voltage can be compatible with LC and with water. In these water-soluble polymer-based NCAP embodiments, the desired material may have smaller impact on overall switching speed and switching voltage because some fraction may not move to the LC droplet surface due to much higher viscosity of this system.

Figure 5A:
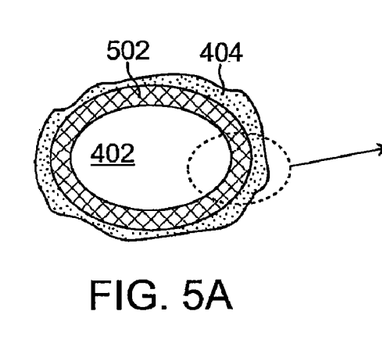
FIGS. 5A and 5B are a schematic illustration of the invention including an interfacial agent layer in the LC/polymer composite matrix, according to embodiments of the present invention.
Figure 5B:
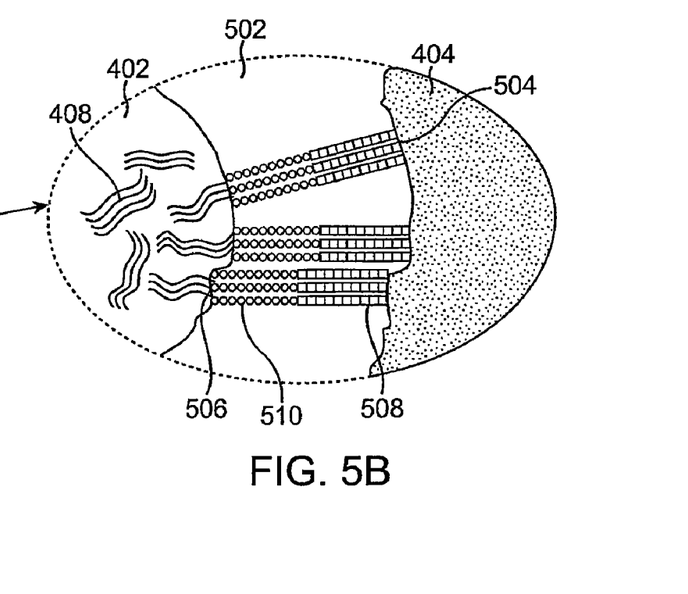

Embodiments of the present invention comprise a specific family of interfacial agent materials that are mixed with the liquid crystal and polymer material in order to minimize the anchoring and/or frictional force between the LC droplets and the polymer matrix. In specific embodiments, the proposed materials comprise non-ionic interfacial agents, such as block co-polymers, and/or cross-linkable reactive surfactants. FIG. 5A illustrates LC droplets such as droplet 402 located within the polymer matrix 404 with an interface layer 502 comprising an interfacial agent. The interface layer 502 is shown schematically in FIG. 5B with a magnified view of the droplet/interfacial agent/polymer interfaces. These interfacial agents can form interface layer 502 if they are comprised of molecules that include two parts with appropriate chemical characteristics and the interfacial agent(s) are present in sufficient quantity during formation of the LC material. As schematically shown in FIG. 5B, a first portion 508 of the interfacial agent, for example a polymer compatible portion of the interfacial agent molecule, is located near polymer matrix 404, and a second portion 510, for example a low surface tension portion of the interfacial agent molecule, is located near droplet 402 and contacts droplet 402 so as to decrease friction and/or anchoring of LC crystals with droplet 402. First portion 508 of the interfacial agent dissolves in polymer matrix effectively immobilizing the interfacial agent within the polymer matrix. The immobilization of the interface layer to the polymer matrix may be either physical (for block copolymers) or chemical bonding (via cross-linking as in the case of reactive surfactants). This immobilization of the interface layer can provide increased stability, for example at increased temperature, of the interface layer. The second portion 510 of the interfacial agent comprised within the interface layer has a chemical composition that presents low surface tension and/or low friction to the LC molecules and/or crystals. The anchoring and/or friction between the LC molecules 408 and the polymer matrix 404 is reduced by the interface layer 502, and thus alignment orientation and switching speed of the LC molecules when an-electric field is applied can happen faster and at lower drive voltages.

interfacial agent surfactants such as those listed in Table 1. In many embodiments, a pronounced improvement in intrinsic switching voltage sensitivity can be achieved using interfacial agents having defoaming properties. For example, Surfynol DF series compounds can substantially reduce the operating voltage of latex-based NCAP.

Figure 9A:
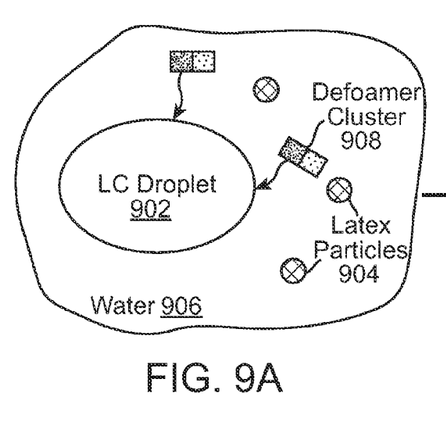
FIG. 9A is a schematic illustration of defoaming agent in a latex/water/LC mixture prior to drying, according to embodiments of the present invention.
Figure 9B:
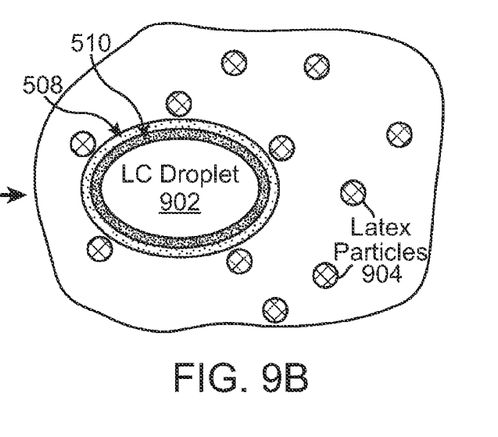
FIG. 9B is a schematic illustration of defoaming agent in a latex/LC mixture after drying, according to embodiments of the present invention.

Defoaming agents are a class of surfactants that can be dispersed in an aqueous medium. In many embodiments, defoaming agents have a very low solubility in an aqueous medium, and may have a HLB (hydrophile-lipophile balance) less than 10. FIGS. 9A and 9B are schematic illustrations of a defoaming agent in a latex-based NCAP. Because the defoamer has very low solubility in water, the defoaming

TABLE 1

Examples of Interfacial Agents

| Name | Description | Manufacturer |
| --- | --- | --- |
| BYK-022 | Mixture of hydrophobic solids and foam destroying polysiloxanes in polyglycol | BYK Chemie |
| Fluorolink D10 | A-$CF_2O(CF_2CF_2O)_m(CF_2O)_nCF_2$-A, A = $CH_2OH$, MW = 1000 | Solvay Solexis |
| Fluorolink D | A-$CF_2O(CF_2CF_2O)_m(CF_2O)_nCF_2$-A, A = $CH_2OH$, MW = 500 | Solvay Solexis |
| Surfynol DF-58 | A silicone-based foam control agent useful in aqueous systems. The product has strong foam control and de-aeration performance. | Air Products |
| Surfynol DF-62 | An ether-modified polysiloxane-based defoamer designed to provide excellent knockdown defoaming and sustained antifoaming over time. | Air Products |
| Surfynol DF-574 | A self-emulsifying product formulated with organic and organo-modified silicone components, which provides effective removal of entrained air and foam generated during the manufacturing process. | Air Products |
| Surfynol DF-695 | A silicone emulsion defoamer, which provides initial and sustained defoaming performance in water-based formulations. 100% active liquid. | Air Products |
| Flexiwet NI-M100 | Partially fluorinated alcohol that has been ethoxylated | Innovative Chemical Technologies, Inc. |
| Flexiwet NI-55 | Nonionic (fluoro) polymer surfactant with no functionality | Innovative Chemical Technologies, Inc. |

Table 1 is a partial list of interfacial agents according to embodiments of the present invention. The interfacial agents may be combined with either NCAP 104 based materials in FIG. 1 or PDLC 102 based materials in FIG. 1. As shown in the examples below, driving voltages can be significantly reduced by adding small percentage of non-ionic interfacial agents into NCAP or PDLC formulation. The low surface tension portion of the interfacial agent molecules may be comprised of fluorinated compounds such as Fluorolink D or Flexiwet, or comprised of silicone copolymers or polymersiloxanes such as Surfynol DF-62, BYK-022. In particular, the reactive fluorinated compounds may have chemical structures noted in Table 1, and the siloxanes may have reactive end groups such as —OH, —$NH_2$, or —COOH, for example. In many embodiments, these materials move to the LC/polymer interface during LC/polymer phase separation process. The other portion of the interfacial agent molecules may physically bond to the polymer via such mechanisms as hydrogen bonding, Van Der Vaals forces, and/or chemical bonding if there are reactive groups in the polymer matrix. Slight heating may accelerate the chemical bonding process.

Embodiments of the present invention can show improvement in the switching voltage of both latex-based NCAP and water-soluble polymer-based NCAP, such as PVA, using agent can form small "clusters," for example clusters 908. Each of the clusters can comprise molecules with a first portion 908A and a second portion 908B. First portion 908A of the molecules of the cluster can have hydrophilic properties and second portion 908B of molecules of the cluster can have hydrophobic properties, as described above. In many embodiments, the clusters may have micelle shapes with first portion 908A oriented outward toward the solution and second portion 908B oriented inward toward the other molecules of the defoamer cluster. During emulsification, the clusters can inhibit formation of foam by breaking many air bubbles. After emulsification and de-gas, the clusters 908 are free to move within the mixture of LC particle 902, latex 904, and water 906. In many embodiments, clusters 908 can migrate toward the surface of LC particle 902. As the NCAP is dried, the defoamer can form an interface agent layer around droplet 902 that is between the LC particle 902 and the latex 904. In many embodiments, the low surface tension end portion of the defoamer molecule is dispersed adjacent to the LC and the anchoring end portion of the defoamer molecule becomes tied to the latex.

In many water-soluble polymer-based NCAP embodiments, the defoaming agents act similarly to the latex-based NCAP process, and the defoaming agent can act so as to defoam during emulsification and then form an interface layer that reduces anchoring and/or friction subsequent to emulsification and/or during drying. In some water-soluble polymer-based NCAP embodiments, the material can have a high viscosity prior to drying that may affect formation of the interfacial layer with the defoaming agent. In some water-soluble polymer embodiments, a 10% solution of PVA can be used, which may have a viscosity on the order of 10,000 cp. In contrast, latex-based formulations prior to drying may be on the order of 1-100 cp. Hence, the likelihood of the defoaming agents reaching LC surfaces of the droplets formed in water-soluble polymer-based NCAP may be smaller than in latex-based NCAP, as the increased viscosity may decrease migration of the defoaming agent to the LC droplets. Although the switching speed performance improvement and/or decrease in intrinsic operating voltage for latex-based NCAP may be more significant than for water-soluble polymer-based NCAP, at least some of the clusters of defoaming agent can reach the LC surfaces of the droplets in the water-soluble polymer embodiments, such that some improvement can be obtained. The interfacial agents described herein can also be used with many other liquid crystal/polymer composite material systems, such as those shown in FIG. 1 including, for example, solvent induced phase separation (SIPS) PDLC, UV-PDLC, and so forth.

Lifetime Improvements with Protective Coatings

Electro-optical voltage imaging sensors developed by Photon Dynamics, Inc., and described for example, in U.S. Pat. Nos. 6,151,153 and 7,099,067, previously incorporated herein by reference, can operate at a close distance from the panels under test (PUT). Whereas the sensors may operate with a zero gap, in practice gaps between the sensors and PUT can be in the range 10 to 35 micrometers, with the upper end of the range capped by the sensitivity of the sensors. The lower end of the range is governed by particles and other contaminants that may ride on the surface of the PUT. Such particles may be trapped between the sensor and PUT while the sensor is moving relative to the PUT, and cause damage to either the PUT or the sensor. Thus, as large an operating gap as possible is desired to avoid damage to the PUT and to the sensor.

The addition of the interfacial agent as described herein can allow operation at gap distances, for example 35 um to 75 um, with sensitivity that is comparable to voltage imaging systems without the interfacial agent operating at gap distances of 10 to 35 um, respectively. However, such an operating gap can be comparable to the largest particulates that may be left on the PUT surface during processing, and so an additional means to ensure good lifetime may be used.

One approach is to apply a hard coating material to the modulator surface directly. Some examples of materials that do not impact the electro-optical sensing properties of the modulator include:

a. UV curable hard coating formulations, such as mixtures of multifunctional acrylates, di-functional acrylates, silicone acrylates and optional nano-particles as reinforcement fillers;

b. Sol-gel formulations, such as all non-conductive and low dielectric constant metal oxides made from their corresponding metal alkoxide sol-gels. The most suitable material of this family is silica sol-gel. Organic additives may be necessary to promote the adhesion to Mylar on modulator surface.

c. Thermal curable (low temperature and room temperature curing) materials, such as epoxy, urethane formulations;

d. Organic/inorganic composite materials. All above (a, b, c) organic coating material can be combined with inorganic fillers to further improve the hardness.

The coating and assembly process for creating electro-optical modulators have been described in the following prior patents: U.S. Pat. Nos. 6,211,991 (Bryan); 6,866,887 (Chen); and 7,099,067 (Chen), the full disclosures of which have been previously incorporated herein by reference. One successful approach for modulator protection is described in U.S. Pat. No. 7,099,067 "Scratch and Mar Resistant PDLC Modulator", the full disclosure of which has been previously incorporated herein by reference. Solvent based, ultraviolet (UV) curable formulations are preferred for easy wet-coating process. As an example, a UV curable organic hard coat may contain the following components: i) multi-functional acrylates; ii) silicone acrylates; iii) nano-sized particles (filler); iv) photo-initiators; and v) solvent.

Coating of any of the above hard coat formulations is then applied to the modulator top Mylar by using wet-coating process such as doctor blade, wire wound rod, and spinner, etc. Spin coating is preferred because it gives favorable coating thickness uniformity. The coating thickness is controlled to 2~20 microns. In the case of the UV hard coat, after complete solvent evaporation, the coating is cured under UV irradiation.

Figure 8A:
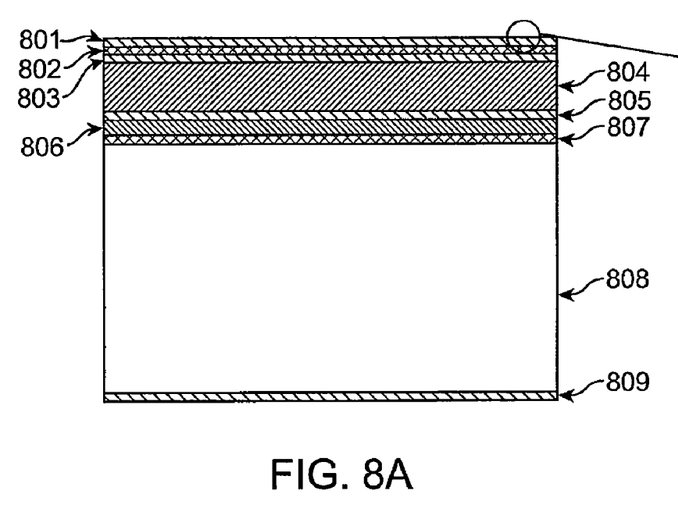
FIGS. 8A and 8B show a cross-section of an electro-optical modulator assembly, according to embodiments of the present invention.
Figure 8B:
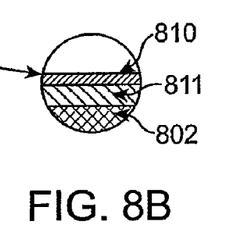

FIGS. 8A and 8B schematically illustrate the various layers within the electro-optical modulator assembly of the voltage imaging system as in FIG. 1, fabricated with a lamination process, according to embodiments of the present invention. A hard coating layer 801 comprises a major hard coating 811 and a thinner slip agent layer 810. In many embodiments, the hard coat has been cured. LC/polymer composite sensor material 804 can be applied onto the glass substrate either by direct coating or lamination. Embodiments made with the lamination process comprise first coating a plastic sheet 806 (such as Mylar) having transparent conductive layer 805 with either NCAP comprising an interfacial agent as described above or PDLC 804 comprising an interfacial agent as described above. A second layer of plastic sheet is added (with or without conductive layer). This sandwiched structure is then laminated on the glass substrate 808 by using optical adhesive 807. The top plastic sheet of the LC/polymer sandwich is then peeled off, and discarded. A dielectric mirror film 803 (or pellicle) is formed on plastic sheet 802, and then added to the assembly stack. Many embodiments use a vacuum assisted attachment process as described in U.S. Pat. No. 6,866,887. An anti-reflective coating 809 is applied to the bottom surface of a glass substrate 808.

In many embodiments of the present invention, a latex based NCAP material and/or water-soluble polymer-based NCAP material incorporating an interfacial agent as described above, can be protected with the coating and assembly process as described in U.S. Pat. Nos. 6,211,991 (Bryan); 6,866,887 (Chen); and 7,099,067 (Chen).

Additional description of hard coating formulation and process examples are described in U.S. Pat. No. 7,099,067, the full disclosure of which has been previously incorporated herein by reference.

EXAMPLE 1

Figure 6:
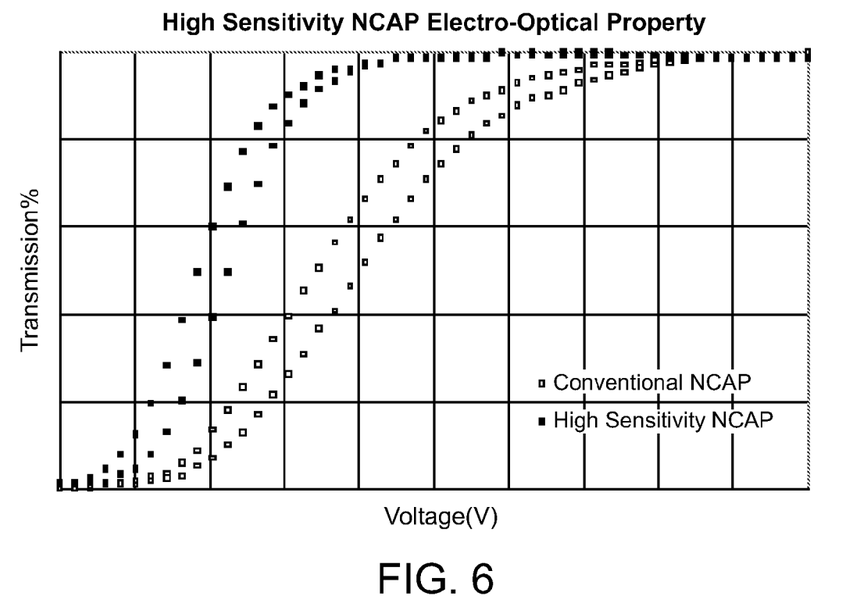
FIG. 6 show a sample of transmission-bias voltage curves of NCAP material showing the improvement when an interfacial agent is added, according to embodiments of the present invention.

Latex-based NCAP formulation MLC-7022-100/Neorez R-967 (manufactured by EM Industries and NeoResins a division of Avecia, respectively) with 67/33 wt % ratio is selected as a base liquid crystal material. Any one of the interfacial agents shown in Table 1 is selected, for example an interfacial agent comprising Surfynol DF type defoamer. The interfacial agent from Table 1 is added in quantity of approximately 1-5 wt-% of total solid content. In some embodiments, the interfacial agent selected from Table 1 can be added in quantities up to 10% by weight. All components are mixed with a high speed blender to form NCAP emulsion and coated on a substrate with an ITO film. The NCAP latex based emulsion coated on the substrate is allowed to dry and laminated with ITO substrate. The transmission curve is then measured. The driving voltage versus percent transmission curve is shown in FIG. 6. As shown, a lower driving voltage between the electrodes is required for the NCAP formulation with the interfacial agent, and the intrinsic switching voltage and operating voltage between electrodes is reduced by more than 30%.

EXAMPLE 2

Figure 7:
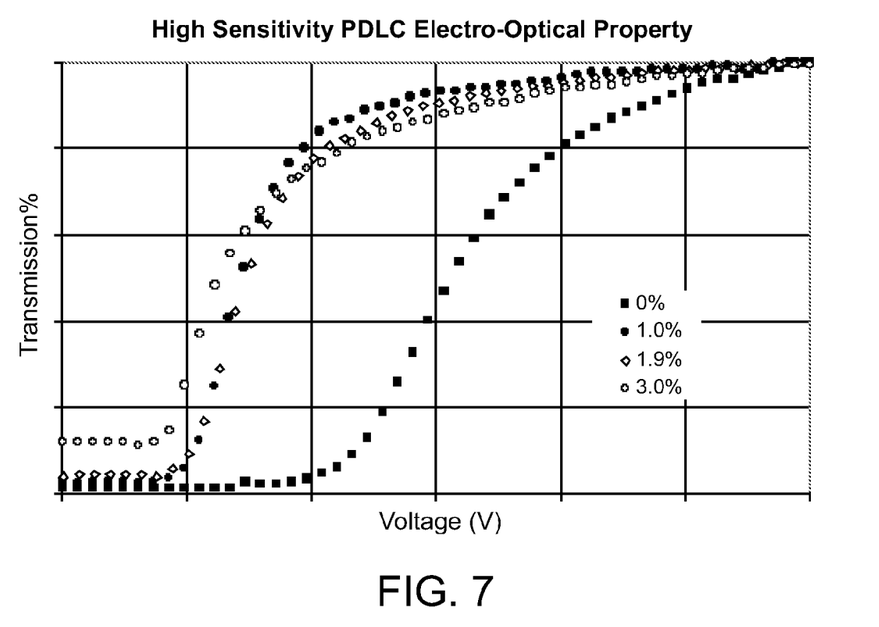
FIG. 7 show a sample of transmission-bias voltage curves of PDLC material showing the improvement when an interfacial agent is added, according to embodiments of the present invention.

A solvent-induced phase separation PDLC formulation TL205/AU1033 (manufactured by EM Industries, and Rohm and Haas, respectively) with 67/33 wt-% ratio is selected as a base liquid crystal material. Methyl isobutyl ketone is used as solvent and Isocyanate such as Desmodur N75 BA/X made by Bayer is added into the mixture as cross-linking agent. Any one of the interfacial agents of Table 1 can be selected, for example Surfynol DF type defoamer. The interfacial agent selected from Table 1 was added in varying quantities of 0, 1.0, 1.9 and 3.0%. In some embodiments, the interfacial agent selected from Table 1 can be added in quantities of 4, 5 and up to 10% by weight. The resulting driving voltage vs. percent transmission curve is shown in FIG. 7. Slight heating is applied on the PDLC coating to accelerate the crosslink between hydroxyl groups (in both interfacial agent and AU1033) with isocyanate. As shown, a more than 50% lower driving voltage is required for the PDLC formulation with interfacial agent, such that the intrinsic switching voltage of the LC material and operating voltage between electrodes is reduced. Improvement in intrinsic switching voltage over the 0% control material can also be obtained with materials comprising 5 to 10% by weight of the interfacial agent.

Similar results to those shown in FIGS. 6 and 7 may be achieved using combinations of other PDLC or NCAP base liquid crystal formulations with small quantities of interfacial agents, such as those listed in Table 1.

EXAMPLE 3

An organic hard coating comprising of multi-functional acrylates, silicon acrylate as a slip agent, nano-sized silica as an inorganic filler, a (meth)acrylate terminated toughener and photo-initiators is applied to a Mylar sheet. The organic hard coating has 3H to 6H pencil hardness, good adhesion to Mylar, and slippery surface. The thickness of organic hard coating is approximately 5 microns. The dielectric constants of the organic and organic/inorganic hybrid hard coatings are in the range of 3~5, well less than a dielectric of 30 that can impact the spatial resolution and therefore the EO performance of the modulator. The coating can be softer than thin film transistor (TFT) panel so that the modulator will not damage the panel in case the modulator touches the panel. The hard coating layer is added to the assembly stack as described above.

While the exemplary embodiments have been described in some detail, by way of example and for clarity of understanding, those of skill in the art will recognize that a variety of modification, adaptations, and changes may be employed. Hence, the scope of the present invention should be limited solely by the appending claims.

What is claimed is:

1. An NCAP latex-based modulator with a protective coating, said modulator comprising:
    an NCAP latex based material comprising an interfacial agent;
    a dielectric mirror pellicle laminated on top of the NCAP material; and
    a cured UV curable organic hard coating on the mirror pellicle.

2. The modulator of claim 1 wherein the interfacial agent comprises a defoaming agent.

3. The modulator of claim 2 wherein an amount of the defoaming agent is sufficient to decrease an operating voltage of the modulator.

4. The modulator of claim 2 wherein the defoaming agent comprises a siloxane with a reactive end group in an amount sufficient to decrease an operating voltage of the modulator.

5. The modulator of claim 2 wherein the defoaming agent comprises a reactive fluorinated polymer present in an amount sufficient to decrease an operating voltage of the modulator.

6. The modulator of claim 2 wherein the defoaming agent comprises a non-ionic block copolymer present in an amount sufficient to decrease an operating voltage of the modulator.

7. The modulator of claim 1 wherein the UV curable organic coating comprises a mixture of multi-functional acrylates, silicone acrylate as a slip agent, a (meth)acrylate terminated toughener, nano sized silica as an inorganic filler, and photo-initiators.

* * * * *